United States Patent [19]

Wiegman et al.

[11] 4,230,944

[45] Oct. 28, 1980

[54] X-RAY SYSTEM EXPOSURE CONTROL WITH ION CHAMBER

[75] Inventors: Douglas C. Wiegman, La Grange Park; James A. Grichnik, Elk Grove Village, both of Ill.

[73] Assignee: Advanced Instrument Development, Inc., Melrose Park, Ill.

[21] Appl. No.: 10,550

[22] Filed: Feb. 9, 1979

[51] Int. Cl.$^3$ .......... G01T 1/42; G01T 1/00

[52] U.S. Cl. .......... 250/355; 250/385; 250/402; 250/409

[58] Field of Search .......... 250/401, 402, 374, 375, 250/385, 408, 409, 322, 413, 354, 355, 394

[56] References Cited

U.S. PATENT DOCUMENTS

| | | | |
|---|---|---|---|
| 3,284,631 | 11/1966 | Splain | 250/413 |
| 3,356,847 | 12/1967 | Splain | 250/413 |
| 3,569,711 | 3/1971 | Stoms | 250/394 |
| 3,884,817 | 5/1975 | Jilbert | 250/385 |
| 4,039,811 | 8/1977 | Ennslin et al. | 250/409 |
| 4,121,104 | 10/1978 | Richter | 250/402 |

*Primary Examiner*—Alfred E. Smith
*Assistant Examiner*—Thomas P. O'Hare
*Attorney, Agent, or Firm*—Leo J. Aubel

[57] ABSTRACT

This invention relates to an X-ray system including an ion chamber for monitoring and controlling the amount of radiation delivered to the X-ray film.

2 Claims, 7 Drawing Figures

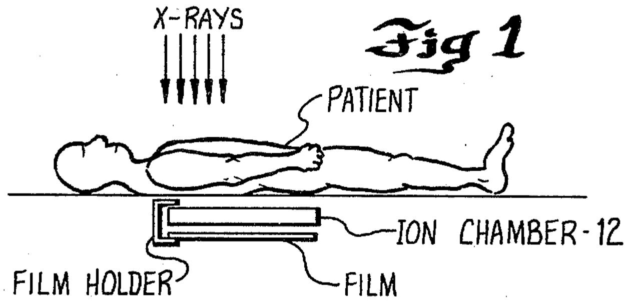
Fig 1
Fig 2
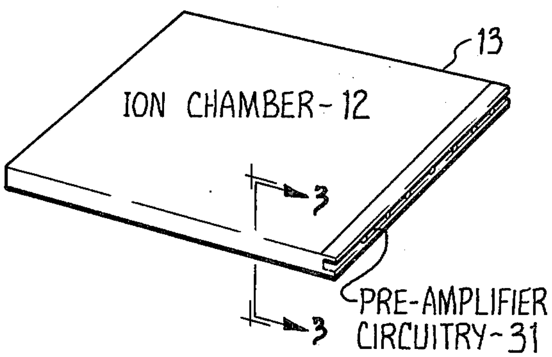
Fig 3
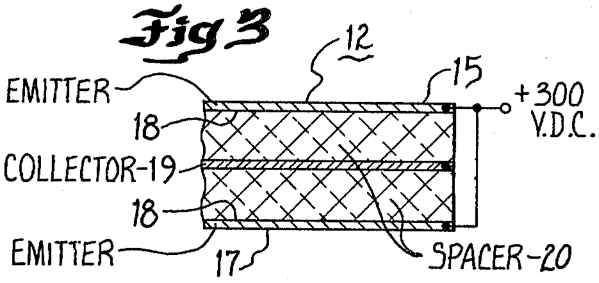
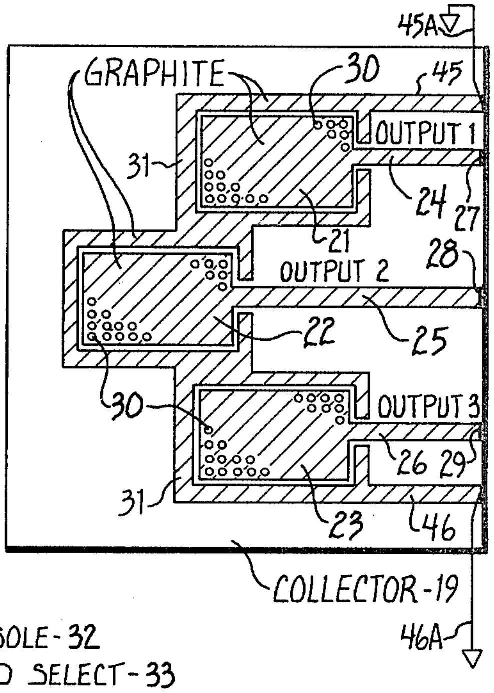
Fig 4
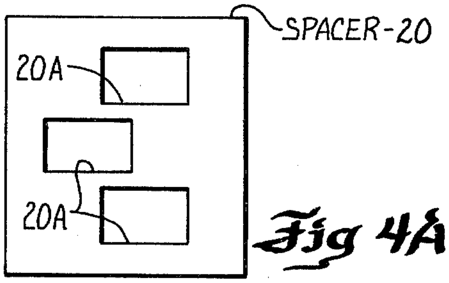
Fig 4A
Fig 5
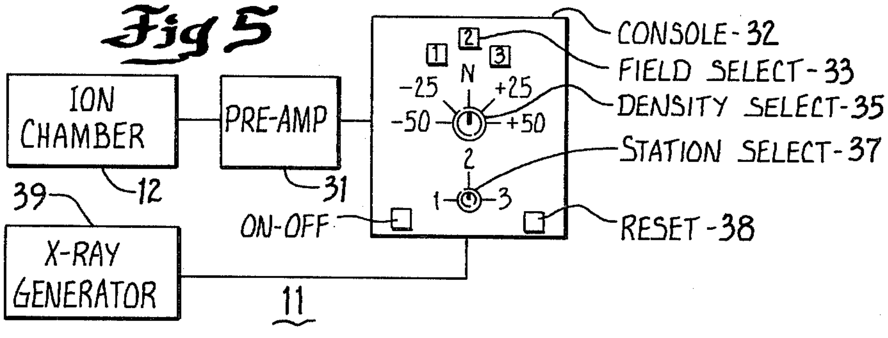
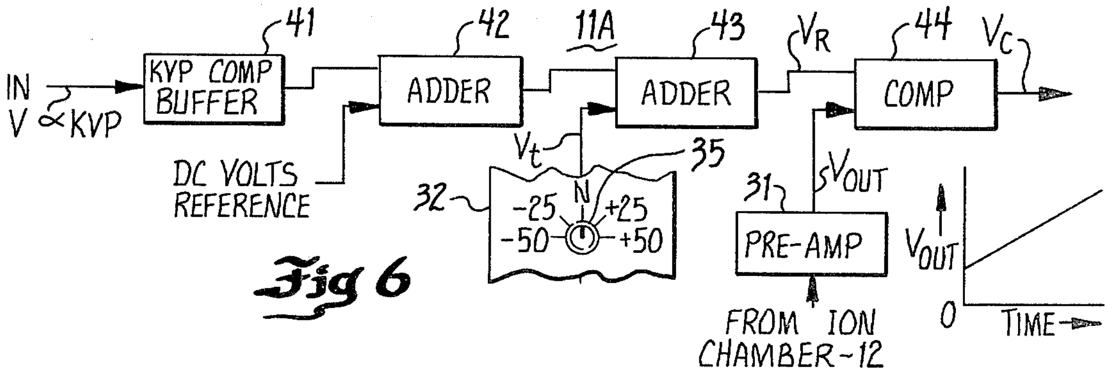
Fig 6

X-RAY SYSTEM EXPOSURE CONTROL WITH ION CHAMBER

BACKGROUND OF THE INVENTION AND STATEMENT OF PRIOR ART

Various methods of controlling the amount of radiation provided by X-ray source are known in the prior art. One of the common ways is to arbitrarily set the amount of current through the X-ray tube and terminate the exposure at a predetermined time by means of a timer, as disclosed in U.S. Pat. No. 3,284,631. Another method is to position a phototube adjacent the X-ray sensitive film to provide a measure of the total radiation passing through the object to the film. Current through the phototube which is proportional to the radiation impinging on the tube may be digitized and summed and the exposure terminated when a predetermined total has been reached, as disclosed in U.S. Pat. No. 3,356,847. Other methods have attempted to maintain the voltage and current applied to the X-ray tube constant, to thereby maintain constant X-ray exposure values, as disclosed in U.S. Pat. No. 4,039,811.

Ion chambers of various types and configurations are well known in the art, and may be conventionally connected to provide a signal proportional to the X-ray radiation impinging thereon.

SUMMARY OF THE INVENTION

The present invention is directed to an X-ray system which includes an ion chamber for monitoring the amount of radiation delivered to an X-ray film. The kVp (peak kilovoltage) and mA (milliamperes) settings of the system X-ray generator will have an influence on the exposure time required to produce good quality images. The ion chamber is electrically connected to the X-ray generator to selectively terminate the output of the generator to achieve good quality images regardless of the kVp and mA settings of the generator.

DESCRIPTION OF THE DRAWINGS

Objects and advantages in addition to those specifically set forth will become apparent from the reference to the accompanying drawings and following description wherein:

FIG. 1 is a pictorial representation of the invention as used with a patient;

FIG. 2 is an isometric view of the ion chamber of FIG. 1;

FIG. 3 is a cross-section view taken along the line 3—3 of FIG. 2;

FIG. 4 is a plan view showing the three fields or sections of the ion chamber;

FIG. 4A is a plan view of the space material showing the apertures, pockets or chambers therein;

FIG. 5 shows the inventive system in block form; and,

FIG. 6 is an electronic block diagram of the inventive system.

DETAILED DESCRIPTION OF THE INVENTION

Refer first to FIG. 1 which schematically illustrates the positioning of the ion chamber 12 of the invention in a typical application. As shown, the ion chamber 12 is mounted in the film holder intermediate the source of X-rays and X-ray film, thus, the ion chamber 12 monitors the radiation passing through the patient to the X-ray film.

Refer now to FIG. 2 which shows one embodiment of the ion chamber 12 wherein the chamber housing 13 is 19.75" in length, 18" in width and 0.37" in height. Solid state preamplifier circuitry 31 of suitable known design is packaged to fit and extend along one edge of ion chamber housing 13. Briefly, the ion chamber 12 senses the amount of radiation and converts this into an electrical signal which is amplified by preamplifier 14 for further processing, as will be described.

Refer now also to FIG. 3. The outer surfaces or sheets 15 and 17 of the ion chamber housing 13 are formed of a commercially available plastic; such as 14 mil Milanex ® plastic or Mylar ® plastic coated with a thick layer of conductive lead 18. A center sheet 19 (to be described more fully with respect to FIG. 4), is separated from the sheets 15 and 17 by layers of a soft insulator filler or spacer material 20 such as Styrafoam ® material of one pound density. The sheets 15 and 17 are connected to a source of positive potential, such as the 300 V.D.C. indicated, to form the emitter electrodes for the ion chamber 12.

FIG. 4 is a plan view of the collector 19 which shows the various fields or sections 21, 22 and 23 into which the ion chamber 12 of the embodiment shown is divided. The fields 21, 22 and 23 are similar and each comprises an area or section formed of a conductive graphite coating. A narrow conductive section 31 surrounds the fields 21, 22 and 23. The fields are individually energizable and are electrically separated from one another. Each of the fields 21, 22 and 23 include graphite paths 24, 25 and 26 extending toward the edge of the sheet 19 to enable electrical connection thereto as at 27, 28 and 29, respectively. Conductive connectors (tails) 45 and 26 are connected from opposite edges of section 31 to ground reference (OV) such as through leads 45A and 46A to reduce charge migration between chambers.

The fields 21, 22 and 23 are perforated by a matrix of small apertures or holes 30. The purpose of the holes 30 is to balance the charges (ions) on each side of the collector 19. In one embodiment shown, the holes are 3/16 inch in diameter and are separated by 1/16 of an inch, with a total of about 100 holes in each field. As noted in FIG. 3, the operating potential for ion chamber 12 is 300 V.D.C., and it operates to monitor X-ray tubes operating in the 50 to 150 kVp range.

FIG. 4A is a plan view of one of the spacers or fillers 20 shown in cross section in FIG. 3, and which may be of Styrafoam ® material of approximately 5/32 inch thickness. Each spacer 20 has three rectangular apertures, pockets or chambers 20A formed therein, which are of approximately the same size as the respective fields 21, 22 and 23, which are on the collector 19. The apertures or chamber 20A formed in spacer 20 are positioned adjacent respective fields of collector 19 form air pockets which are selectively ionized, when the respective field is energized, as is known.

More specifically, assume the ion chamber 12 is in operating position as shown in FIG. 1. When the voltages are applied to one or more of the fields 21, 22 and 23 of the ion chamber 12, the X-rays are directed through the ion chamber as indicated in FIG. 1, the air in chambers 20A of the selected fields will be ionized as a function of the applied X-radiation causing an electrical signal to be generated in the ion chamber 12, as is known in the art. As indicated in FIG. 3, each of the fields 21, 22 and 23 produces a separate output, which output can subsequently be processed as described below.

Refer now to FIG. 5 which shows the inventive system 11 in block form and shows the ion chamber 12 electrically connected through the preamplifier circuitry to the system console 32. Console 32 includes various controls including the field select switch 33 comprising three push-buttons labeled 1, 2 and 3 which select the fields 21, 22 and 23 which are to be operationally connected to couple an output from the ion chamber 12 to the X-ray generator 39. Any one of the fields 21, 22 or 23, or any combination of fields, may be selectively operated by actuating the buttons. As is known, the field or fields are selected by the operator dependent on which part of the body, and the size of the area of the body which is to be exposed.

A density select rotary switch 35 on console 32 allows the user to adjust the film density in five ranges from −50% to +50% of a desired normal reference. A station select switch 37 enables the user to select a desired one of three available detector stations namely, (a) the table station, (b) the chest station, both utilizing the ion chamber, or (c) a phototube station.

A reset push-button switch 38 on console 32 is illuminated whenever an exposure exceeds the selected maximum of 600 mA. Should this occur, the operator actuates the reset button 38 to terminate the exposure.

A 600 mA limit circuitry is provided in console 32 which senses the actual tube current such as by the provision in the circuit of a resistance element connected in series with the ground return lead of the X-ray tube, as is known in the art. The voltage developed is integrated with respect to the exposure time to determine when limiting should occur.

The exposure control system 11 is a solid state system which monitors the amount of radiation provided or delivered to the X-ray film and provides a control signal to terminate the radiation when it is determined that the proper amount of radiation has been delivered to the film. The system 11 is connected to the associated X-ray generator 39 as shown in FIG. 5 to allow the user to achieve a good quality image regardless of the kVp and the mA settings on the generator 39.

The signal generated by the ion chamber 12 is processed and amplified in the preamplifier circuitry 31 and coupled to a console and interface unit 32. Also the input data and power to the system 11 is brought to the console or unit 32 from the X-ray generator 39 and processed to produce standard analog voltage levels.

Refer now to FIG. 6 which shows the adder and comparison circuitry 11A of the system 11. A voltage V from X-ray generator 39 proportion to the kVp being applied to the associated tube is coupled through a buffer 41 to an adder 42. Adder 42 sums the output from buffer 41 with a DC voltage reference, and this summed signal is completed to a second adder 43. Adder 43 in turn sums the output from adder 42 with a voltage $V_t$ corresponding to the density select setting on switch 35 to compensate the device in order to maintain its desired film density regardless of the generator kVp settings. Variations between X-ray generators may require differing connection procedures. The output $V_r$ of adder 43 is coupled to a comparator 44 which compares the voltage $V_r$ with a voltage $V_{out}$ from preamplifier 31 which is dependent on, or is a measure of the radiation impinging on the selected fields of ion chamber 12. Note the small graph of FIG. 6 which shows the output $V_{out}$ of preamplifier 31 is an increasing voltage dependent on time. The output from comparator 44 is a voltage $V_c$ which is coupled back as a control for the output of the X-ray generator 39, see FIG. 5. A signal to end or terminate the exposure is generated when the exposure control determines that the proper amount of radiation has been delivered to the X-ray film.

While the invention has been particularly shown and described with reference to preferred embodiments thereof, it will be understood by those skilled in the art that various changes in form and details may be made therein without departing from the spirit and scope of the invention.

I claim:

1. An X-ray exposure control system for an X-ray diagnostic installation including an X-ray generator and an X-ray tube directing X-rays through the patient to an X-ray film, said exposure control system comprising in combination means providing kVp and mA settings for said X-ray generator, the kVp and mA settings affecting the exposure time required to produce desired images on said film, an ion chamber including a plurality of selectively energizable ironizable fields for monitoring the amount of radiation provided to an X-ray film by said X-ray generator, and said ion chamber fields being electrically coupled to said X-ray generator selectively terminating the output of said X-ray generator, electronic circuitry for monitoring and controlling the time of operation of said X-ray generator, said circuit receiving a first voltage proportional to the kVp being applied to the associated tube, means for providing a reference voltage, means for combining said first voltage with said reference voltage to provide a first control signal, means for combining a voltage proportional to a density selection factor to said first control signal to obtain a second control signal, means for obtaining a voltage dependent on the radiation impinging on the selected fields of said ion chamber and means for comparing the said dependent voltage with said second control signal to provide an output control signal to terminate the radiation from said X-ray generator, said ion chamber including a plurality of discrete fields which may be selectively energized, said fields comprising an emitter electrode extending over a limited area, a collector electrode of substantially the same size as said emitter electrode spaced from said emitter electrode, spacer material positioned between said electrodes and having apertures formed therein adjacent said fields to form air chambers, a second emitter electrode of substantially the same size as said collector electrode spaced from said collector electrode, the X-rays passing through said apertures ionizing the air thereon, and holes in said fields adjacent said apertures for balancing the ionizing potential.

2. An X-ray exposure control system for an X-ray diagnostic installation including an X-ray generator and an X-ray tube directing X-rays through the patient to an X-ray film, said exposure control system comprising in combination means providing kVp and mA settings for said X-ray generator, the kVp and mA settings affecting the exposure time required to produce desired images on said film, an ion chamber including a plurality of selectively energizable ionizable fields for monitoring the amount of radiation provided to an X-ray film by said X-ray generator, and said ion chamber fields being electrically coupled to said X-ray gnerator selectively terminating the output of said X-ray generator, electronic circuitry for monitoring and controlling the time of operation of said X-ray generator, said circuit receiving a first voltage proportional to the kVp being applied to the associated tube, means for providing a reference voltage, means for combining said first voltage with said reference voltage to provide a first control signal, means for combining a voltage proportional to a density selection factor to said first control signal to obtain a second control signal, means for obtaining a voltage dependent on the radiation impinging on the selected fields of said ion chamber and means for comparing the said dependent voltage with said second control signal to provide an output control signal to terminate the radiation from said X-ray generator, each of said fields comprising a laminated member including a first sheet portion forming an emitter electrode extending over a preselected area, a second sheet forming a collector electrode of substantially the same size as said emitter electrode, a spacer material intermediate said sheets, said spacer material having apertures therein for providing an ionizable air space between said electrodes, and holes in said collector for enabling the ionizing potential to be balanced across said field.

* * * * *